Figure 1:
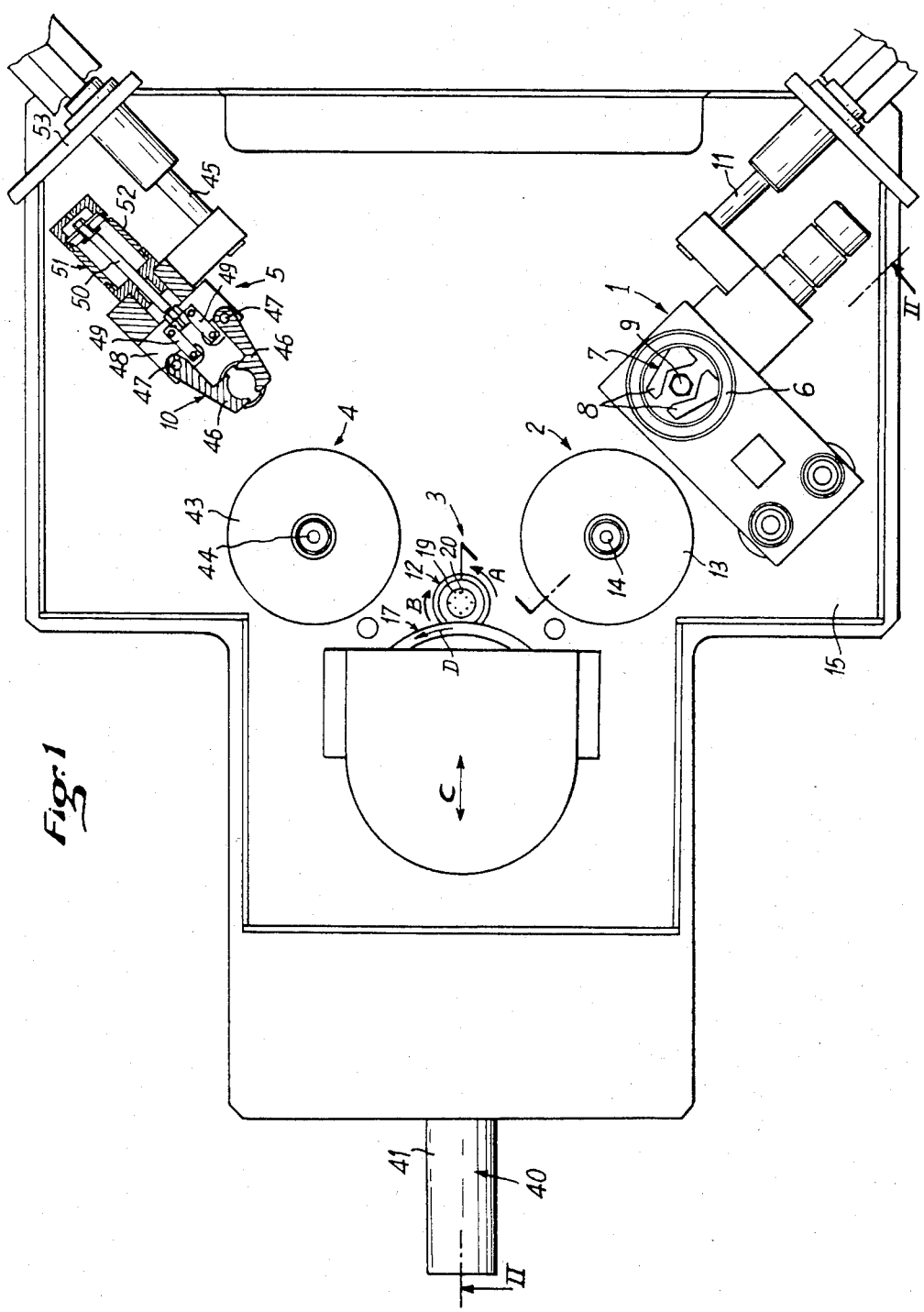

United States Patent [19]

Cailloux

[11] Patent Number: 4,503,761
[45] Date of Patent: Mar. 12, 1985

[54] MACHINE FOR FASHIONING VEGETABLES AND SIMILAR PRODUCTS

[76] Inventor: Jean-François Cailloux, 12, allée de Montfermeil, 93340 Le Raincy, France

[21] Appl. No.: 467,804

[22] Filed: Feb. 18, 1982

[30] Foreign Application Priority Data

Feb. 23, 1982 [FR] France .................. 82-02928

[51] Int. Cl.³ .................. A23N 7/00; A23P 1/00
[52] U.S. Cl. .................. 99/486; 99/541; 99/546; 99/590; 99/591; 99/595; 99/623; 99/636
[58] Field of Search .................. 99/537, 486, 539-541, 99/546, 567, 584, 591, 588-590, 593-595, 623, 635-637, 643; 426/482, 484, 512, 514, 518

[56] References Cited

U.S. PATENT DOCUMENTS

| | | | |
|---|---|---|---|
| 2,085,225 | 6/1937 | Lucks | 99/546 X |
| 2,447,640 | 8/1948 | Dunn | 99/590 X |
| 2,790,275 | 4/1957 | Castonguay | 99/546 X |
| 3,075,634 | 1/1963 | Schwacofer . | |
| 3,156,276 | 11/1964 | Petrella et al. | 99/623 X |
| 4,108,059 | 8/1978 | Loveland | 99/543 |
| 4,109,021 | 8/1978 | Loveland . | |

FOREIGN PATENT DOCUMENTS

| | | |
|---|---|---|
| 69821 | 7/1891 | Fed. Rep. of Germany . |
| 2525784 | 12/1976 | Fed. Rep. of Germany . |
| 1447631 | 6/1966 | France . |
| 2153470 | 5/1973 | France . |

*Primary Examiner*—Timothy F. Simone
*Attorney, Agent, or Firm*—Toren, McGeady and Stanger

[57] ABSTRACT

A machine for fashioning vegetables and similar products.

The machine comprises: a fashioning gripper 12 comprising two jaws 18, 19 adapted for seizing the vegetable via opposed axial actions; a fashioning tool 17 rotating about an axis parallel to the common axis of the fashioning gripper and of the vegetable, said tool being in the shape of a solid of revolution about its rotation axis; means 40 for successively bringing the fashioning tool 17 near and away from the fashioning gripper 12; means 27 for rotating the gripper about itself over a predetermined angle, between two fashioning operations, and an outlet cutting station with two spaced apart cutting tool 43, adapted for eliminating on the facetted vegetable end portions, at least in the areas where the fashioning tool has not removed material, so that the machined facets end axially on two end radial faces.

15 Claims, 20 Drawing Figures

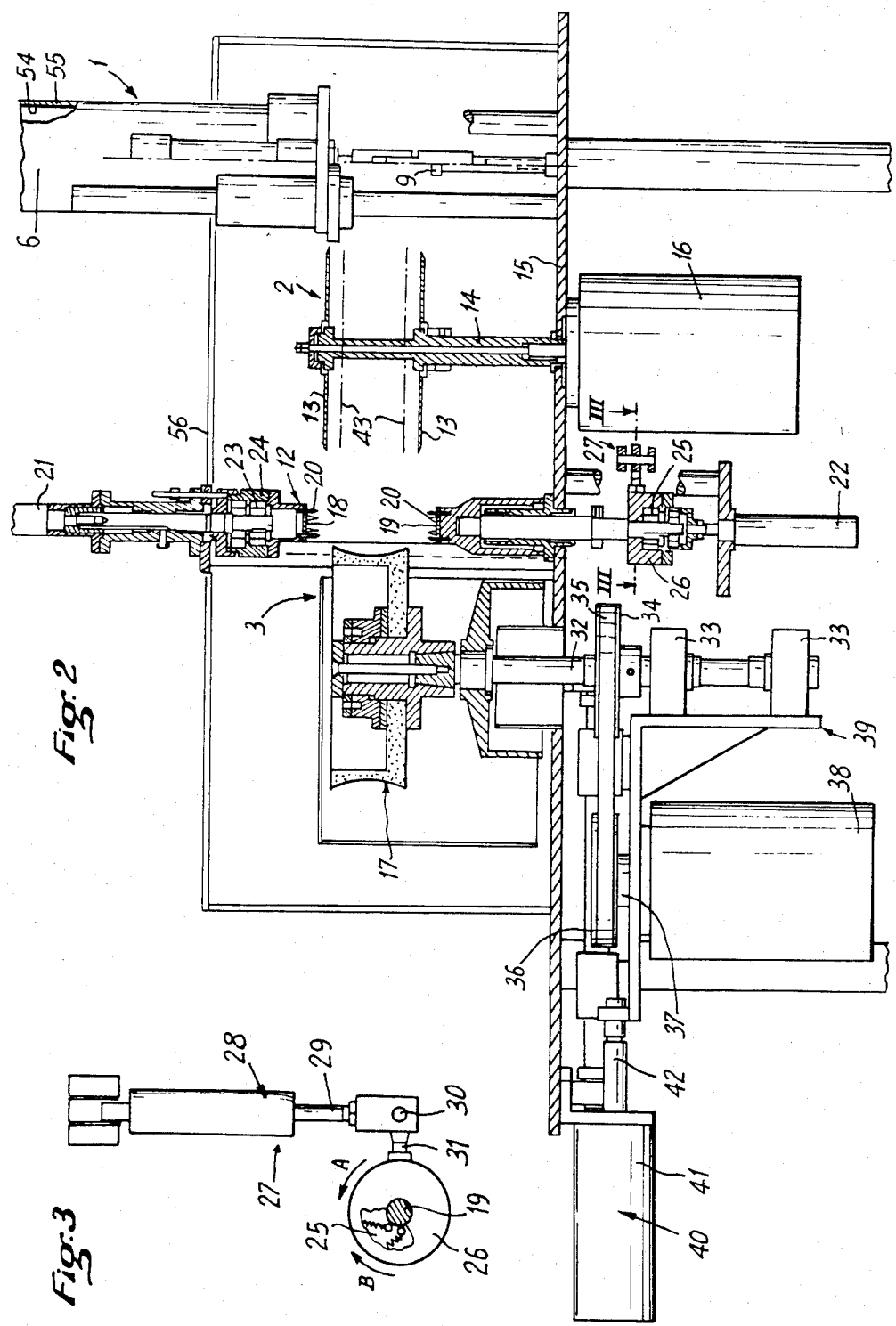

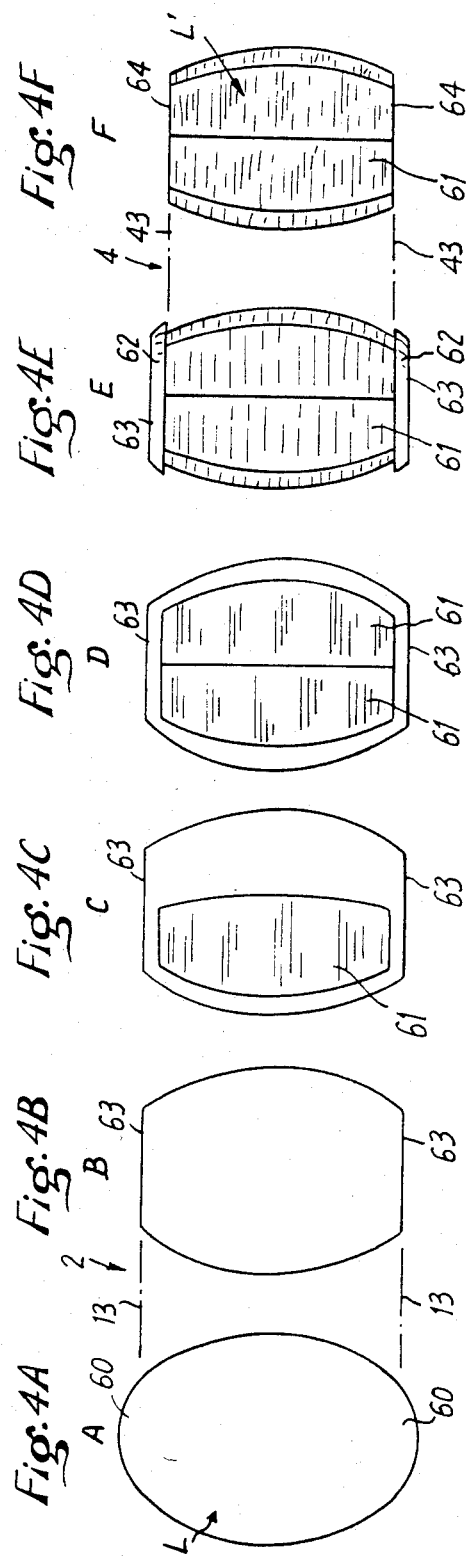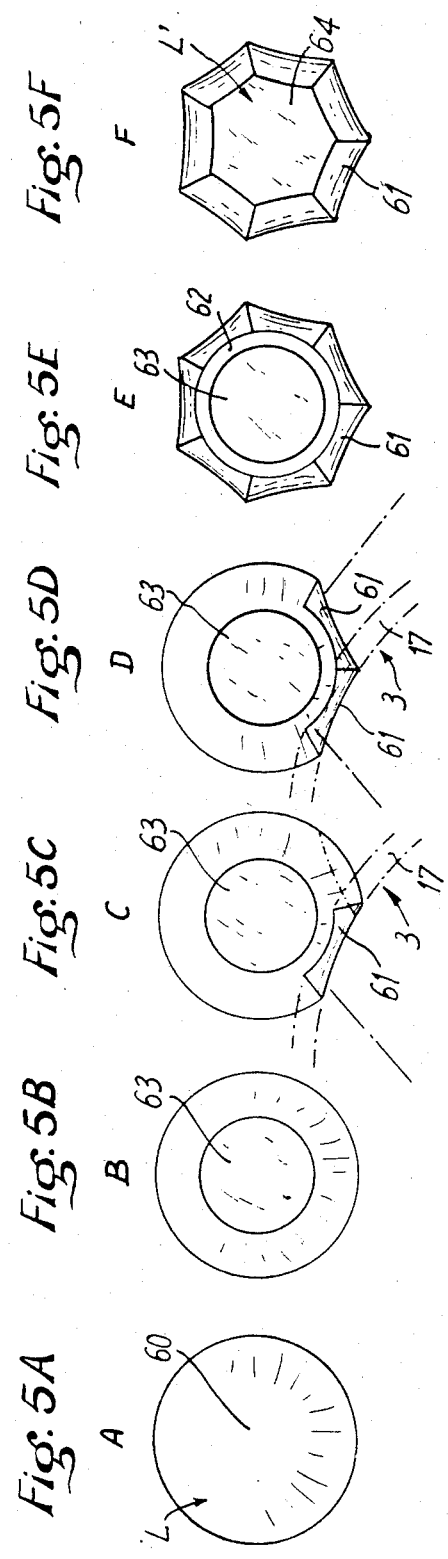

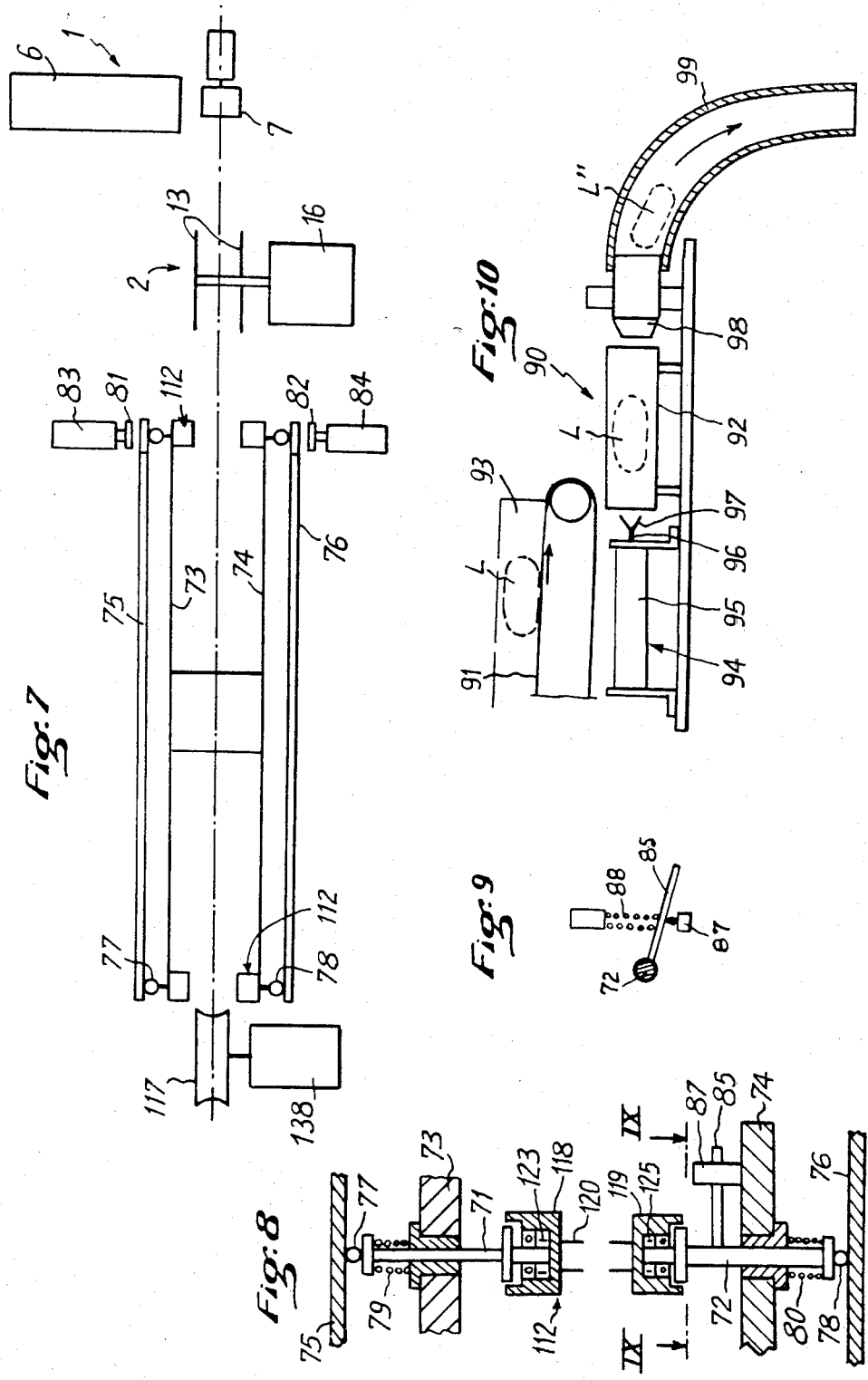

MACHINE FOR FASHIONING VEGETABLES AND SIMILAR PRODUCTS

In the culinary art, by the term of fashioned or sculped vegetable is meant a vegetable presented and served to the consumer under a particular geometrical shape comprising successive curved facets circularly distributed, the end of the vegetable being cut off so as to form two planar parallel end faces.

This mode of presentation applies not only to vegetables (potatoes, carrots, turnips, etc. . . . ), but also to some fruits or citrus fruits (apples, etc. . . . ).

For the time being, the fashioning of vegetables is only done by hand; by using a knife or other peeling implement, the operator forms one by one the successive facets, then cuts off the two ends of the vegetable. It is easily conceivable that this work is delicate and lengthy; the result is that the fashioned vegetables are reserved to high class or half-luxury cuisine, and therefore costly.

The object of this invention is to provide a machine for mechanically and rapidly fashioning vegetables or similar, without direct manual intervention of the operator on the vegetable.

To this effect, the machine according to the invention comprises: a fashioning gripper comprising two jaws adapted for seizing the vegetable via antagonistic axial actions; a fashioning tool rotating about an axis parallel to the common axis of the fashioning gripper and of the vegetable, said tool being in the shape of a solid of revolution about its rotation axis; means for successively bringing the fashioning tool near and away from the fashioning gripper; means for rotating the gripper about itself over a predetermined angle, between two fashioning operations, and an output cutting station with two spaced apart cutting tools, adapted for eliminating on the vegetable formed with facets its end portions at least in the areas where the fashioning tool has not removed material, so that the machined facets end axially on two end radial faces.

According to a preferred embodiment, the machine comprises in addition at least one of the following elements: a feeding station including a mobile feeding gripper, with axis parallel to that of the vegetable and arranged for seizing the latter on its peripheral surface while leaving clear its end portions; an input cutting station with two spaced apart cutting tools, adapted for initial elimination on the vegetable of the two end portions; driving means for passing successively the feeding gripper from a vegetable feeding station to said input cutting station, then to the fashioning gripper; a discharge station including a mobile discharge gripper, with an axis parallel to that of the vegetable and arranged for seizing the latter on its facetted peripheral surface, while leaving clear the axial ends of the vegetable; driving means for passing successively the discharge gripper from the area of the fashioning gripper to the output cutting station, then to a discharge station where it releases the finished vegetable.

Figure 6:
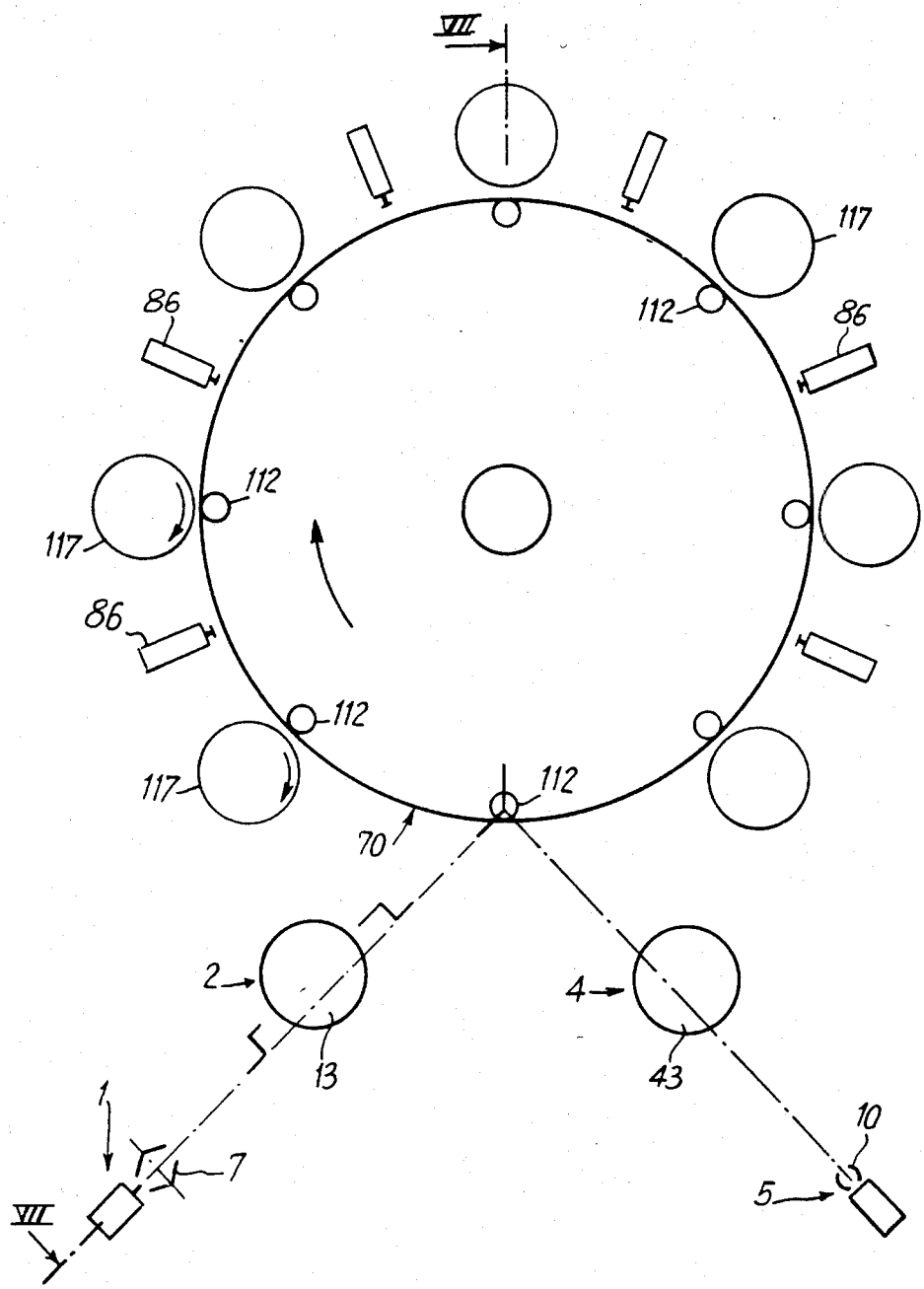

Further features of the invention will become more apparent from the following description, with reference to the accompanying drawings wherein:

FIG. 1 is a top plan view of the machine according to the invention for fashioning one vegetable at a time, FIG. 2 is a vertical sectional view along line II—II of the machine of FIG. 1, FIG. 3 shows, in a sectional view along line III—III of FIG. 2, a detail of the machine, FIG. 4A to 4F and FIG. 5A to 5F are respective elevation and top plan views showing the vegetable in its various processing phases, FIG. 6 is a schematic top plan view of a sequential machine for fashioning several vegetables at the same time, FIG. 7 is a sectional view along line VII—VII of the machine of FIG. 6, FIG. 8 is an axial sectional view at a larger scale of a fashioning gripper of the machine of FIG. 6, FIG. 9 is a sectional view along line IX—IX of FIG. 6 showing a detail, and FIG. 10 shows schematically an alternative embodiment for feeding the vegetables.

The machine shown at FIG. 1 to 3 is provides for fashioning one vegetable at a time. For the sake of clarity, the vegetable is shown only in FIG. 4 and 5 in its various machining phases.

It comprises: a feeding station 1 for the vegetables L; a first cutting station 2 for eliminating on the vegetable to be fashioned the axial end domes 60; a fashioning station 3 where facets 61 are fashioned by successive machining operations, with removal of material; a second cutting station 4 for eliminating on the vegetable axial end portions 62, and a discharge station 5 of the fashioned and finished vegetable L'.

Station 1 includes a fixed vertical hopper 6 for feeding unpeeled vegetables L, in which vegetables are introduced from the top with their axis in a vertical position.

The hopper 6 converges downwardly and is opened at its lower end in order to deliver the lower vegetable to a feeding gripper 7 the two jaws 8 of which can tip each about a vertical axis.

Under the gripper 7 is provided a fixed abutment 9 defining the position of the lower vegetable once discharged from the hopper 6 in order to be taken over or engaged by gripper 7.

According to an advantageous feature which is visible in FIG. 2, the hopper 6 is provided inside with a resilient sleeve 54 over its whole height. The sleeve is tightly and fixedly connected to the upper and lower edges of the hopper in order to define an annular chamber 55 with the hopper rigid wall. Said chamber 55 can be inflated in a controlled manner (from a source of compressed air or from a pneumatic jack) so as to retain by friction the vegetables piled up in the hopper.

The jaws 8 have a small thickness, so as to seize the vegetable L by its peripheral surface while leaving widely clear or free the axial ends of the vegetable.

The structure itself of the feeding gripper 7 and its control means are identical to those hereafter described for the discharge gripper 10 of the discharge station 5.

The gripper 7 is carried by a horizontal rod 11 which is axially slidable so that the gripper 7, in succession, passes through the axis of hopper 6, passes through the first cutting station 2 and comes in coaxial position with the fashioning gripper 12 of fashioning station 3, in order to then come back in coaxial position with the hopper 6. The control means (not shown) for the motion of rod 11 are for example of the jack type.

The first cutting station 2 includes two spaced apart circular saws 13, keyed onto a common vertical shaft 14. The shaft extends downwardly beyond the working table 15 in order to be driven in a continuous rotation by an electrical motor 16. The saws 13 are axially spaced apart in order to eliminate on the vegetable passing between them a dome 60 at each axial end thereof and thereby define two plane radial parallel surfaces 63.

The gripper 7 and the saws 13 are arranged such that the gripper and its movable equipment strike neither the saws nor the shaft 14. When the gripper 7 carrying a vegetable L passes, in a continuous motion, through the cutting station 2, the gripper passes between the saws 13 and the two domes 60 are separated.

The fashioning station 3 includes two essential parts: the fashioning gripper 12 and the fashioning tool 17.

The fashioning gripper 12 has a vertical axis and comprises two jaws 18, 19 provided with vertical teeth or needles 20. Said jaws are vertically slidable under the control of respective double-effect jacks 21, 22, driven simultaneously. Moreover, the upper jaw 18, due to the interposition of a free-wheel device 23 (FIG. 2) the lower ring 24 of which is fixed, can rotate freely about its axis in the direction of arrow A (FIG. 1), while it is secured against rotation in the reverse direction, shown by arrow B. In the same manner, a free-wheel device 25 is placed between the lower jaw 19 and a control outer ring 26. The free-wheels 23, 25 are mounted in the same direction so that the jaws, relative to their respective outer rings 24, 26, can rotate freely in the direction A and are blocked in direction B, for a reason which will become clear herebelow.

While the upper outer ring 24 is secured against rotation, the lower outer ring 26 is on the contrary adapted for rotating about itself according to a step-by-step motion under the control of an indexing system 27 (FIG. 2 and 3). This system includes for example a double-acting jack 28 the stem 29 of which is articulated via a ball-joint 30 on an arm 31 which is rigidly connected to the outer ring 26.

The amplitude of the jack stroke is set such that, for each contraction or extension stroke, it imparts to ring 26 a rotation of 1/n turn, n being the number of facets 61 to be fashioned on the vegetable. Number n is generally equal to 7.

The orientation of the free-wheel 25 is schematically shown in FIG. 3. One sees that while ring 26 is driven by jack 28 in direction A (jack contraction), the jaw 19 is positively driven in the same direction, whilst, during the driving of the ring in direction B (jack extension), the jaw 19 is not driven. The result is that while ring 26 is kept motionless in rotation by jack 28, jaw 19 cannot rotate in direction B.

The fashioning tool 17 is made of a profiled grinding wheel, so-called forming grinding wheel, for example of silicon carbide of alimentary grade.

It is keyed onto a vertical shaft 32 extending downwardly beyond table 15 and supported by two roller bearings 33. On shaft 32 is also keyed a pulley 34 receiving an endless belt 35 continuously driven by pulley 36 keyed onto the output shaft 37 of an electrical motor 38.

Motor 38 and bearings 33 are carried by a carrier 39, located under the table 15 and adapted for radially sliding relative to the axis of gripper 12, in a direction C, so that the grinding wheel 17 can be sucessively brought near and away from the gripper axis.

The control of the motion of carrier 39 is provided by a double-effect horizontal jack 40 the body 41 of which is fixed and the stem 42 of which is mobile and connected to carrier 39.

In the example shown, the grinding wheel 17 has a generatrix line in the shape of a outwardly concave arc of a circle so that, on the machined vegetable, each facet 61 has a toric shape which is outwardly concave in a radial cross-section and outwardly convex in an axial cross-section.

The grinding wheel 17 is driven in rotation in direction D (FIG. 1); this direction is such that the machined vegetable is biased by the grinding wheel in direction B, in the manner of a gear wheel; due to the presence to the two free wheels 23 and 25 blocking jaws 18, 19 in said direction B, one is sure that the vegetable will not turn. It should be noted that if only one free wheel were provided, for example the lower free wheel 25 which is necessary for the indexation, while leaving the other jaw free in rotation in both directions (the rotation on one direction being necessary for the indexing stage), the vegetable could be subjected to a torsion from the jaw blocked in rotation, which would be detrimental to the machining quality by introducing twisted facets.

The second cutting station 4 is similar to the first cutting station 2. Stations 2, 4 are arranged for example symmetrically relative to the sliding axis C of carrier 39.

Station 4 includes therefore also two circular saws 43 keyed onto a vertical common shaft 44 which is driven by an electrical motor (not visible) mounted under table 15. As shown in chain lines in FIG. 2, the axial spacing between saws 43 is smaller than that of saws 13. At most, it is equal to the axial width of the grinding wheel 17.

The gripper 10 of stripper station 5 is carried by a stem 45 which, under the action of a double effect jack (not shown) can slide axially so that the gripper 10 can come successively in a position coaxial to the fashioning gripper 12 in order to seize the machined vegetable, to pass between the two saws 43 without interfering with them and with shaft 44, for removing the axial end portions 62 of the vegetable which are not machined and provide plane radial end faces 64, and to reach a discharge position (only this position being shown) in which it opens in order to discharge by gravity the finished fashioned vegetable L'.

The gripper 10 includes two jaws 46 articulated each about a vertical axis 47 on the gripper body 48. To each jaw 46 is associated a linkage 49 reaching a common axial stem 50 of the double-effect jack 51 which controls the opening and closing of the gripper and the body 52 of which is fixed on body 48. The stem 45 carries a finger 53 cooperating with the sliding motion jack (not shown).

The operation of the machine is already clear from the above description. However, its main phases will be described as follows.

At the start: the grippers 7, 10 are open and in the position shown in FIG. 1; the vegetables L are piled up in hopper 6 and retained by sleeve 54 stretched by chamber 55 under pressure; the saws 13, 43 and the grinding wheel 17 are rotating; the grinding wheel 17 is retracted; the fashioning gripper 12 is open.

Chamber 55 is disinflated. The vegetable are released and fall by gravity until the lower vegetable comes to bear on the abutment 9 by passing through the opened gripper 7; chamber 55 is set under pressure in order to retain the other vegetables in the hopper; the gripper 7 is closed, then transferred with the raw vegetable L (FIG. 4A and 5A) to the axis of the opened fashioning gripper 12; while passing in station 2, the axial end portions 60 of the raw vegetable are eliminated (FIG. 4B and 5B); the fashioning gripper 12 closes and the feeding gripper 7 opens in order to move back in an empty condition until it reaches a position coaxial to the hopper for a new cycle (gripper 7 remains open until the subsequent seizure of the following vegetable); the grinding wheel 17 is brought forward in order to fashion or shape the first facet 61 (FIG. 4C and 5C); then moves back so as permit the indexation of an angular pitch by system 27; then the grinding wheel moves again forward for fashioning the second facet 61 (FIG. 4D and 5D), then moves back for the following indexation; when all the facets 61 are made (FIG. 4E and 5E) the grinding wheel 17 moves back and gripper 10 moves in an opened condition until it comes in the axis of the fashioning gripper 12; gripper 10 closes and then gripper 12 opens; gripper 10 moves back while carrying the vegetable provided with the facets; it passes through the cutting station 4 (FIG. 4F and 5F) for eliminating the axial end portions 62 of the vegetable which are not machined by grinding wheel 17 and which have traces of the points 20; when gripper 10 reaches the most retracted positions, it opens in order to discharge by gravity the finished turned vegetable L'. Then a new cycle can start again.

These operations can be sequentially controlled directly by the operator, but it is of course preferable to use automatic control means with a programmer including particularly, as is well known by those skilled in the art, any usual limit, detection and safety devices.

Advantageously, the machine can be completed by additional devices such as a protection hood 56 (not shown in the Fig.), a sprinkling and/or blowing system both for cleaning the machined vegetable and for discharging the debris.

As hereabove mentioned, the machine of FIG. 1 to 3 is provided for processing a single vegetable at a time. However, it should be understood that the invention applies also to machines which can process several vegetables at a time.

An example of such a machine is schematically shown in FIG. 6 to 9.

In these Figures, one recognizes the feeding station 1 with the feeding gripper 7 and the hopper 6, the first cutting station 2 with its circular saws 13 and motor 16, the second cutting station 4 with its circular saws 43, and the discharge station 5 with its discharge gripper 10. Said stations 1, 2, 4 and 5 are similar to those of the machine of FIG. 1 to 3, therefore their description need not be repeated.

The single gripper 12 of FIG. 1 to 3 is now replaced by an assembly of vertical gripper 112 regularly distributed on the periphery of a carrousel 70. If n is the number of facets 61 to be provided on a vegetable, n+1 grippers are provided; in the case of 7 facets, eight grippers angularly spaced apart by 45° are then provided.

The grippers 112 are identical. One of them is shown in more detail in FIG. 8. Its general design is similar to that of gripper 12. It has a vertical axis and includes two jaws 118, 119 provided each with axial teeth or points 120. The jaws are carried each by a stem 71, 72, with interposition of a free wheel 123, 125, which extends through upper 73 and lower 74 support plates, forming the carrousel as such, in order to cooperate via their free end each with a fixed cam plate 75, 76, with interposition of a roller bearing 77, 78. The grippers are biased toward the opened condition by a spring 79, 80 acting between plate 74, 75 and the associated stem 71, 72.

In the area in which the carrousel 70 is fed with raw vegetables and from which the finished facetted vegetables are discharged, the fixed plates 75, 76 are interrupted and replaced by pads 81, 82 (FIG. 7) carried by the stems of double-effect jacks 83, 84 driven together. When the jacks are extended, their pads 81, 82 form a prolongation of plates 75, 76 in order to close the gripper present in this area, while, when contracted, their pads move apart and allow springs 79, 80 to open the gripper.

Around the carrousel are regularly disposed fashioning grinding wheels 117, similar to grinding wheel 17. Grinding wheels 117 are driven continuously, either each by its own motor 138 (FIG. 7), or from a single motor driving a common chain or driving belt. As previously, each grinding wheel 117 is adapted for radial motion near and away from the gripper 112 which presents itself.

Carrousel 70 carrying the grippers 112 is imparted with a step-by-step rotation motion bringing successively each gripper, from the input area (which is also the output area), before each grinding wheel.

In order that the vegetable maintained by gripper 112 rotates about its own axis, i.e. with respect to the carrousel plates 73, 74, by 1/n turn by passing from one grinding wheel 117 to the following, the grippers have to be imparted, at each passage between two successive grinding wheels 117, with a rotation the amplitude of which is dependent on the number of facets 61 to be provided and on the angular spacing between two grinding wheels, measured on the carrousel.

For obtaining this result, as shown in FIGS. 8 and 9, one at least of stems 71, 72 of each gripper 112 carries a horizontal arm 85 which, when passing between two successive grinding wheels 117, is driven in rotation by a jack 86; the free wheel 125 permits the rotation of the gripper in the indexation direction but makes its rotation in the other direction impossible when arm 85, being freed from the action of jack 86 which has retracted, comes back against an abutment 87 under the action of a return spring 88. Abutment 87 and spring 88 are carried by a plate 74 of the carrousel.

As a modification, it could be possible to key on each gripper 112 a satellite gear which would mesh with a planetary wheel driven by carrousel 70 with such a gear ratio that each gripper would rotate about its own axis, i.e. with respect to the carrousel plates 73, 74, over 1/n turn between two successive grinding wheels 117.

According to another modification, it could be possible to provide for carrousel 70 a feeding station and a discharge station in positions angularly spaced by one pitch, by adding one gripper, which would allow increasing the production by loading the carrousel with a new vegetable at the same time as a finished fashioned vegetable is being discharged. Then, the two grippers 7, 10 would be operated together, in synchronism.

By imparting to the grinding wheels 117 a forward and backward motion with respect to carrousel 70 and by stopping the carrousel at each fashioning operation, the same facet shape is obtained as with the machine of FIG. 1 to 3, this shape being visible in FIG. 4F and 5F, and outwardly concave in radial cross-section.

However, in a simplified version of the multi-head machine, the grinding wheels 117 could be provided with a fixed axis and the carrousel driven continuously, the indexation of the grippers being provided either discontinuously by the jacks 86, or continuously by the satellite and planetary gearing device. Facets would be obtained which would then be circular and outwardly convex in radial cross-section, but still separated by edges situated each in an axial plane.

Hitherto, it has been assumed that the vegetables L are, when fed into the machine (FIGS. 1 to 3 or FIGS. 6 to 9), in the raw state, meaning that they are neither calibrated or gauged nor machined.

In an alternative embodiment which is mainly, but not exclusively, applicable to potatoes, the vegetables can be gauged by the machine prior to the fashioning operation in order, on the one hand, to reduce the fashioning time as such for each facet, and on the other hand to have as little material as possible removed by the grinding wheel or wheels, thereby reducing the volume of slurry to be discharged and to be recovered from the fashioning station, and allowing recovering the excess material substantially in the form of lumps discharged from the gauging station.

Advantageously, the gauging station is such that the vegetables are presented to the feeding gripper 7 in the shape of a cylinder with two bulging domes at its ends, which are not interested by the gauging operation.

In FIG. 10 is schematically shown such a gauging station 90. The station includes a horizontal conveyor belt 91 the outlet end or discharge of which is in vertical alignment with a V-shaped horizontal channel 92 open upwardly and having a direction parallel to the direction of motion of belt 91. On belt 91, the vegetables L are oriented longitudinally by a plate 93. Under the belt 91 is provided a double effect longitudinal jack 94 the body 95 of which is fixed and the stem 96 of which carries a profiled end member 97 which can move substantially in the middle of the V-shaped channel 92. At the output end of channel 92 is arranged a fixed die 98 forming a circular cutter of horizontal axis. The diameter of die 98 is slightly larger than the diameter of the largest circumscribed circle of the finished vegetable L' (FIG. 5F). At the outlet of die 98 is mounted a flexible rubber tube 99 bent downwardly and opening in vertical alignment with abutment 9 (FIG. 1) from which it is sufficiently apart for the passage of the feeding gripper 7.

The gauging station 90 feeds hopper 6 or replaces it.

The operation is the following. The raw vegetables L are delivered on belt 91 at a predetermined rate; they are longitudinally oriented by plate 93 and fall one by one, in this position, in the V-shaped channel 92 which, if necessary, corrects their position. According to a predetermined cycle, jack 94 is operated for pushing the vegetable towards die 98 which cuts off an annular chip. The vegetable L" discharged from the die is therefore cylindrical in shape with two end axial domes, which are not interested by the gauging operation. Jack 94 goes on pushing the gauged vegetable L" to the bend of the tube, until same falls by gravity on abutment 9, between the opened jaws 8 of gripper 7, or as a modification, in hopper 6.

What is claimed is:

1. A machine for fashioning vegetables or similar articles comprising:
    a fashioning gripper comprising a pair of opposed jaws adapted to grip a vegetable therebetween, said jaws being movable in opposed directions along a common axis extending through said vegetable;
    a fashioning tool arranged adjacent said fashioning gripper and mounted to rotate about an axis parallel to said common axis;
    indexing means for rotating said fashioning gripper about said common axis through a plurality of predetermined angular distances to expose said vegetable held between said jaws to said finishing tool along successive parts of the outer periphery thereof;
    means for successively bringing said fashioning tool toward and away from said fashioning gripper in timed cooperation to effect application of said tool to said successive parts of the outer periphery of said vegetable, said fashioning tool operating to form facets on said vegetable;
    an output cutting station having a pair of spaced apart cutting tools adapted to cut along two parallel planes and spaced apart a distance at least approximately equal to the axial length along which said fashioning tool engages said vegetables; and
    means for passing said vegetables between said cutting tools with said common axis perpendicular to said parallel planes, said spaced apart cutting tools thereby operating to cut from said vegetable parts extending beyond said facets so that said facets end axially at two planar end faces formed by said cutting tools on said vegetable.

2. A machine according to claim 1 further comprising at least one of the following elements: a feeding station including a mobile feeding gripper, with axis parallel to that of the vegetable and arranged for seizing the latter on its peripheral surface while leaving clear its end portions; an input cutting station with two spaced apart cutting tools, adapted for initial elimination on the vegetable of the two end portions; driving means for passing successively the feeding gripper from a vegetable feeding station to said input cutting station, then to the fashioning gripper; a discharge station including a movable discharge gripper, with an axis parallel to that of the vegetable and arranged for seizing the latter on its facetted peripheral surface, while leaving clear the axial ends of the vegetable; driving means for passing successively the discharge gripper from the area of the fashioning gripper to the output cutting station, then to a discharge station where it releases the finished facetted vegetable.

3. A machine according to claim 1 or 2, wherein the fashioning tool is outwardly concave and of a toric shape with a generatrix line in the form of an arc of a circle.

4. A machine according to claim 1 or 2, further comprising an input hopper, preferably converging, in which the vegetables are retained by a resilient sleeve defining with the hopper wall an inflatable chamber.

5. A machine according to claim 1 or 2, wherein each gripper is arranged for passing freely between the two cutting tools, said tools being preferably circular saws.

6. A machine according to claim 1 or 2, wherein one at least of the jaws of the fashioning gripper is associated with a free-wheel system allowing the gripper to rotate about itself for the indexation step-by-step rotation, but preventing it to rotate under the effect of the driving provided by the fashioning tool during the machining of a facet.

7. A machine according to claim 1 or 2, wherein the indexation step-by-step rotation of the fashioning gripper is obtained by an arm carried by the gripper and driven in rotation by a jack.

8. A machine according to claim 1 or 2, further comprising a single fahioning tool and a single fashioning gripper having a fixed axis.

9. A machine according to claim 1 or 2, further comprising several fashioning tools and several fashioning grippers having a mobile axis.

10. A machine according to claim 9, wherein the grippers are regularly distributed on the periphery of a rotating carrousel, the number of grippers being at least equal to that of the fashioning tools and preferably higher by one or two units relative to said number, the fashioning tools being regularly distributed about the carrousel.

11. A machine according to claim 10, wherein the grippers can rotate about themselves with respect to the carrousel and cooperate by their ends which are remote from the jaws with closing fixed plates, said plates being omitted in the vegetable loading and discharging area or areas of the carrousel, gripper closing means being provided in said areas.

12. A machine according to claim 10, wherein the carrousel is driven continuously in rotation and the fashioning tools have a fixed axis.

13. A machine according to claim 10, wherein the carrousel is driven in rotation step-by-step, and the fashioning tools are adapted for a radial motion near and away of the carrousel.

14. A machine according to claim 10, wherein each gripper carries a satellite gear meshing with a planetary wheel coaxial with the carrousel, the gear ratio being such that each gripper turns about $1/n$ turn (n being the number of facets on the finished vegetable) with respect to the carrousel between two successive fashioning tools.

15. A machine according to claim 1 or 2, further comprising a gauging input station for the vegetables, said station including an input conveyor, a die in the shape of an annular cutter and a discharge conveyor.

* * * * *

UNITED STATES PATENT AND TRADEMARK OFFICE
CERTIFICATE OF CORRECTION

PATENT NO. :  4,503,761
DATED      :  March 12, 1985
INVENTOR(S) :  Jean-Francois Cailloux It is certified that error appears in the above-identified patent and that said Letters Patent is hereby corrected as shown below:

In the heading of the Patent, it should read:

[22]   Filed:          Feb. 18, 1983

Signed and Sealed this

Twenty-ninth Day of October 1985

[SEAL]

Attest:

DONALD J. QUIGG

Attesting Officer

Commissioner of Patents and
Trademarks—Designate